Sept. 9, 1969    M. E. NEUMANN    3,466,466
STATIC ALTERNATING CURRENT CIRCUIT BREAKING DEVICE
Filed April 4, 1966    2 Sheets-Sheet 1

Inventor
Manfred E. Neumann
By R.J. Falkowski
Attorney

Sept. 9, 1969     M. E. NEUMANN     3,466,466
STATIC ALTERNATING CURRENT CIRCUIT BREAKING DEVICE
Filed April 4, 1966     2 Sheets-Sheet 2

Inventor
Manfred E. Neumann
By R. J. Falkowski
Attorney

United States Patent Office 3,466,466
Patented Sept. 9, 1969

3,466,466
STATIC ALTERNATING CURRENT CIRCUIT BREAKING DEVICE
Manfred E. Neumann, New Berlin, Wis., assignor to Allis-Chalmers Manufacturing Company, Milwaukee, Wis.
Filed Apr. 4, 1966, Ser. No. 539,938
Int. Cl. H03k *17/60, 17/74*
U.S. Cl. 307—252                                13 Claims

ABSTRACT OF THE DISCLOSURE

A control circuit fires thyristors at zero crossing points of an AC source. A continuous unidirectional gate control signal is applied to each thyristor at a preselected level of the half cycle of the source during which the said thyristor is reverse biased in anticipation of becoming forward biased so that the said thyristor begins to conduct when the source voltage passes through zero.

---

This invention relates to circuit breakers, particularly to static circuit breakers for alternating current systems.

A circuit breaker for alternating current of relatively large magnitude normally requires either means to extinguish the created arc or means to interrupt at a zero current point. Elaborate arc extinguishing and timing devices are often used to accomplish either or both of these goals.

With the development of static components, it has become possible to consider using these devices in switching circuits for alternating current of relatively high voltage and current. One such device, a silicon controlled rectifier, or thyristor, has characteristics that make its use desirable for opening alternating current systems.

With this invention, a static circuit breaker is provided that can be used to simply and automatically switch off at a zero current point and on at a zero voltage point without creating any transient pulses.

The advantages of a static circuit breaking device according to this invention are: that an unlimited number of thyristor stages can be connected in series or parallel to provide for high voltage or high current operation, that opening occurs only at zero voltage points and closing occurs only at zero current points, that operation can occur with switching durations as small as twenty microseconds, and that switching can be safely provided for high circuit current loads such as capacitor banks.

The objects of this invention are to provide: a new and improved circuit breaking device; a circuit breaking device for alternating currents that eliminates the need for arc suppression; a static circuit breaker that can be utilized for high voltage and high current circuit breaking operations; a circuit breaking device that can be simply controlled by remote control; a circuit breaking device that has a low operation transient noise level; and a static circuit breaker that has a long life expectancy.

Other objects and advantages will be apparent from the following description of embodiments of this invention.

Figure 1:
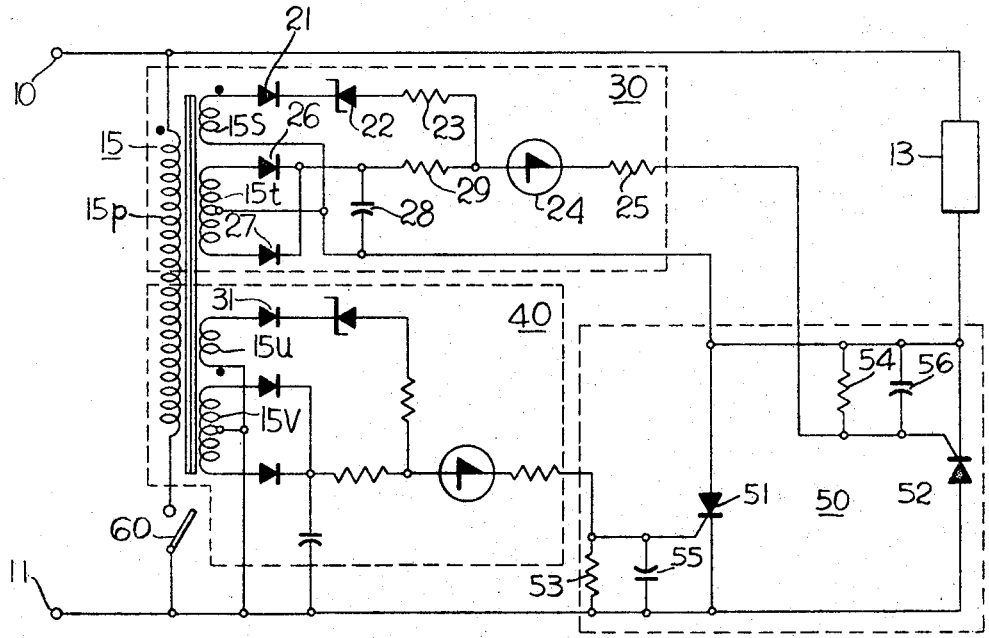
FIG. 1 is a schematic drawing of a circuit breaking device in accordance with this invention.

Referring to FIG. 1, an alternating current power source (not shown) is applied across terminals 10 and 11 for delivery of a load 13. A static switching means 50 is connnected between the source and the load for connecting and disconnecting the source and load. A switching control means, comprising a first control section or means 30 and a second control section or means 40, is connected to control switching means 50. First control means 30 and second control means 40 are similar in construction and operation and are each connected to control the conduction of half cycles of opposite polarity.

Switching means 50 comprises a first thyristor 51 and a second thyristor 52 connected parallel to each other and in polarity opposing directions with each respectively connected to control one-half cycle of the alternating current to load 13. Thyristor 51 has a resistor 53 and a capacitor 55 connected between its gate and cathode, and thyristor 52 has a resistor 54 and a capacitor 56 connected between its gate and cathode.

The switching control means applies appropriate positive input signals to the gates of thyristor 51 and thyristor 52. These signals are applied to and thereafter maintained at the gate terminals of the thyristors to enable the thyristors to turn on at or near a zero voltage point and are removed to enable the thyristors to turn off at a zero current point.

The switching control means comprises a sensing means including a transformer 15 having a primary winding 15p and several secondary windings. First control section 30 includes secondary windings 15s and 15t, and second control section 40 includes secondary windings 15u and 15v.

Considering first control section 30, secondary winding 15s provides a measure of the polarity and amplitude of the alternating current applied at terminals 10 and 11. A rectifying diode 21 limits the response to one polarity and a limiting means such as a Zener diode 22 presents the production of a gating signal until the voltage rises a selected amount above zero. A resistor 23, a hyperconductive diode 24 and a resistor 25 are connected in the circuit between Zener diode 22 and the gate of thyristor 52.

Hyperconductive diode 24 is the type of diode that exhibits negative resistance characteristics such that when a voltage of a magnitude equal to its breakover voltage is applied across its terminals, it becomes conductive and remains on as long as minimum holding current is maintained. The minimum holding current produces a second or holding voltage that is significantly lower than the first voltage.

Secondary winding 15t of transformer 15 is connected to provide full wave rectification with diodes 26 and 27, a filter capacitor 28, and a coupling resistor 29 connected to hyperconductive diode 24.

Second control means 40 is identical to first control means 30 except that it is connected to respond to half cycles of the opposite polarity. This is accomplished, as shown, by connecting secondary windings 15u in opposite polarity relation to winding 15s.

A primary control means such as a switch 60 is provided for controlling the operation of the circuit breaking device by connecting and disconnecting the source and transformer 15. The primary control means could be a manually operated switch, as shown, if the basic problem is turning on the electrical system to connect load 13 to the source; or it could be a current or voltage responsive switching system or relay that disconnects the load from the source under certain circuit conditions, if the basic problem is turning off the electrical system. Whether used for connecting or disconnecting, switch 60 effectively connects load 13 to the source only at zero voltage points and disconnects the source from load 13 from the source only at the zero points in the current wave form.

In the operation of the circuitry shown in FIG. 1, assuming that terminals 10 and 11 are energized, transformer winding 15 is not energized when switch 60 is open. Without current in transformer 15, the gate terminals of thyristor 51 or 52 are not energized and switching means 50 is open. By closing switch 60, transformer 15 and its secondary windings are energized.

Assuming that at the instant of closing switch 60, terminal 10 is positive relative to terminal 11, winding 15s is energized with its upper terminal positive and winding 15u is energized with its lower terminal positive. If the positive amplitude of the half cycle is within a selected middle portion of its half cycle, high enough to break down Zener diode 22 and hyperconductive diode 24, current flows from winding 15s through diode 21, Zener diode 22, resistor 23, hyperconductive diode 24, and resistor 25 to the gate of thyristor 52. The current produces a voltage across resistor 54 and thyristor 52 is placed in a condition to turn on. During the next half cycle when terminal 11 becomes positive relative to terminal 10, thyristor 52 turns on and current flows from terminal 11 through thyristor 52 to load 13.

Under the assumed conditions, thyristor 51 does not receive a gating signal until the following half cycle (when terminal 11 becomes positive relative to terminal 10), because a diode 31, comparable to diode 21, blocks current during this half cycle. Thyristor 51 then turns on near the zero voltage point of the next half cycle when the voltage is in the conducting direction of thyristor 51.

The power supply derived from secondary winding 15t (and 15u) is selected so that after the initial breakover of hyperconductive diode 24, holding current is maintained through hyperconductive diode 24 and current continues from winding 15t, through the full wave rectification system of diodes 26 and 27, through resistor 29, hyperconductive diode 24, resistor 25, and resistor 54 to maintain direct current gate current at thyristor 52.

The closing of switch 60 applies a gating signal to thyristor 51 or 52 only during the portion of the half cycle when the polarity between terminal 10 and terminal 11 is opposite to the conduction direction of the thyristor receiving the gating signal. This gating is maintained as long as transformer 15 is energized. The gated thyristor is then in a condition to turn on at the zero voltage point when the voltage polarity changes to its conducting direction.

To disconnect the source from the load 13, switch 60 is opened to deenergize transformer 15. When this occurs, the gating signals are removed from the gates of both thyristor 51 and 52. The thyristor that is currently conducting continues to conduct until the next zero current point occurs and then turns off. The other thyristor receives no gating signal and therefore remains off.

Since it is often desirable not to have the application of the initial gating signal occur at the zero voltage point, means are provided for preventing the application of the initial gating signal to the gate terminals at the zero voltage points. This is accomplished, as illustrated in FIG. 2, by selecting the characteristics of Zener diode 22 and hyperconductive diode 24 to provide a minimum level at which the positive gating signal is applied to thyristor 52 or, with second control section 40, to thyristor 51.

Figure 2:
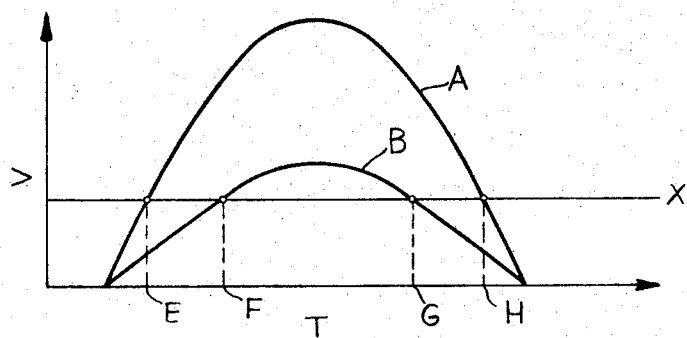
FIG. 2 is a drawing of two characteristic half cycle wave forms.

Referring to FIG. 2, a first typical voltage wave form A and a second typical voltage wave form B are shown. By appropriate selection of components, particularly hyperconductive diode 24, the circuit operates to not apply the gating pulse to the gate of either of the thyristors unless the voltage is above a preselected level X. Thus, the thyristor in the reverse biased condition does not receive a turn-on signal unless the positive wave, upon opening or closing of switch 60, is between lines E and H for wave form A or between F and G for wave form B. By this means, a positive control system is provided that eliminates any error or transient pulses that might occur because of erratic operation near the zero points of the voltage wave form. Also, the level X may be selected to provide a signal indicating the build-up of voltage for a selected load.

Figure 3:
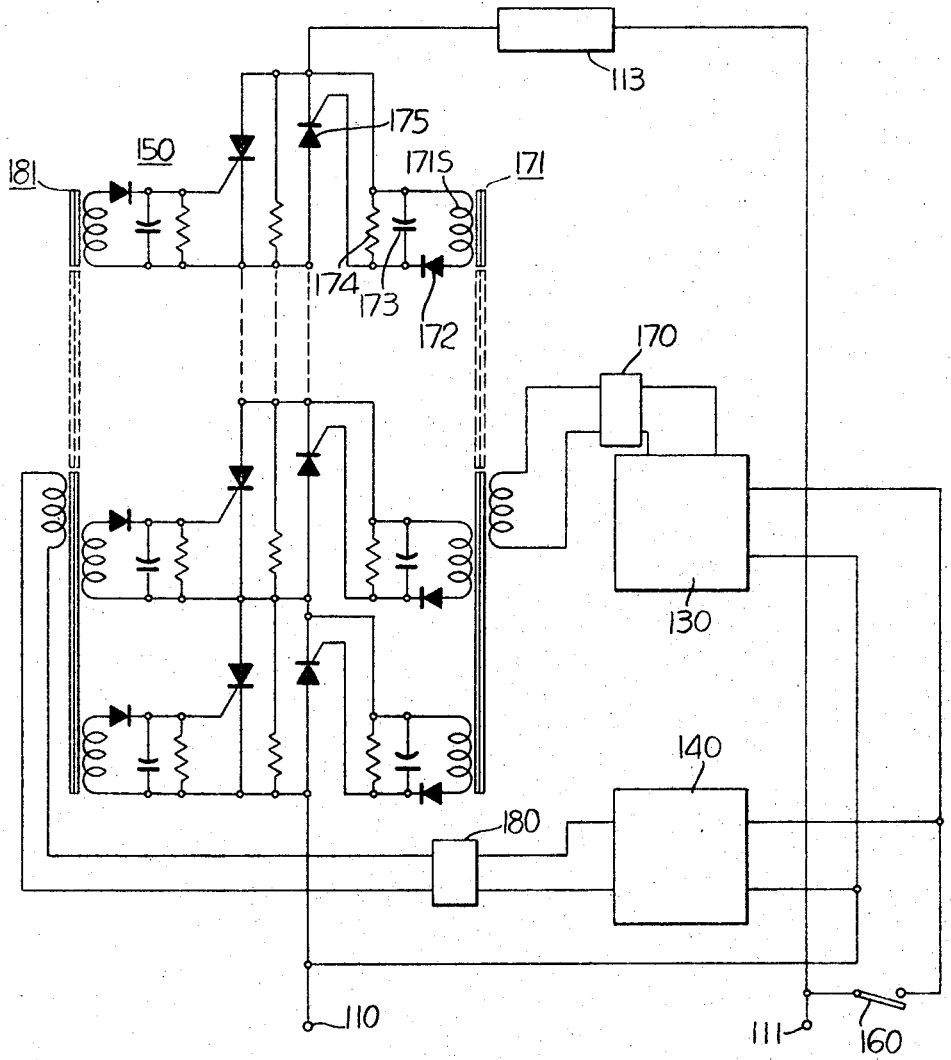
FIG. 3 is a schematic drawing of a circuit breaking device in accordance with this invention that utilizes series connections of thyristors to provide for high voltage operation.

Several thyristors can be connected in series or parallel to provide for high current or high voltage circuit breaking systems. FIG. 3 shows an example of a system that operates in the same manner as the device shown in FIG. 1 and can be utilized to provide relatively high voltage switching. The numerals used in the description of FIG. 3 correspond to related numerals used in FIG. 1 except that they are in the hundred series instead of the ten series.

Referring to FIG. 3, an alternating current source is supplied across terminals 110 and 111 to a load 113 through a static switching means 150. This circuitry operates in the same general manner as the circuitry shown in FIG. 1 with the opening and closing of a switch 160 applying energy for the operation of a first and second control means 130 and 140 to produce the gating signals for switching means 150.

The gating signal to static switching means 150 is provided by control means 130 and 140 in the same general manner as provided by their comparable circuits in FIG. 1 with the essential difference that the continuous direct current output from control means 130 and 140 is supplied to inverters or oscillators 170 and 180, respectively. The inverters provide an alternating output to transformer 171 and 181, respectively. This alternating current is preferably of a high frequency in order to provide substantially instantaneous response at the instant of starting of the inverter. As long as switch 160 is closed so that inverters 170 and 180 are energized, current flows through transformers 171 and 181.

Considering, for example, the secondary windings of transformer 171, one of which, secondary winding 171s, is connected to means for rectifying and filtering the alternating induced current in winding 171s. This means may include a diode 172, a filter capacitor 173, and a resistor 174. During the operation of oscillator 170, transformer 171 is energized and a rectified gating voltage appears across the cathode and gating terminal of a thyristor 175.

Similarly, this current is applied to all the thyristors connected to one transformer, such as transformer 171, and maintains a continuous gating current to the related gating terminal in the same manner as described with the circuit shown in FIG. 1. This circuit eliminates any need for a capacitor sharing network or matching of the switching times of the series connected thyristors because the thyristors are gated on before they conduct current.

It should be understood that I do not intend to be limited to the particular embodiment shown and described for many modifications and variations will be obvious to those skilled in the art.

The embodiments of the invention in which an exclusive property or privilege is claimed are defined as follows:

1. A static circuit breaking system for connecting and disconnecting an alternating current source and a load comprising, in combination,
   first and second thyristors each having an anode, a cathode and a gate with said thyristors connected in parallel and in opposing polarity between said source and said load,
   control means for applying a continuous unidirectional gating signal to the gate of each said thyristor at a preselected level of the half cycle of the voltage of said source during which said thyristor is reverse biased by the voltage of the source, whereby a continuous gating signal is applied to each said thyristor in anticipation of it becoming forward biased so that it begins to conduct when the source voltage passes through zero, and
   switch means for connecting said source to and disconnecting it from said control means.

2. A static circuit breaking system in accordance with claim 1 wherein said first and second thyristors are reverse biased respectively when said source voltage is positive and negative and said control means includes first means responsive to said preselected level of the positive half cycle of the source voltage for applying said continuous unidirectional gating signal to the gate of said first thyristor and second means responsive to said preselected level of the negative half cycle of the source voltage for applying said continuous unidirectional gating signal to the gate of said second thyristor.

3. A static circuit breaking system in accordance with claim 2 wherein said control means includes unidirectional signal deriving means and each of said first and second means for applying said gating signal includes semiconductor breakdown means adapted to be triggered on when said source voltage attains said preselected level for coupling said unidirectional signal deriving means to the gate of the corresponding thyristor, the holding current of said semiconductor breakdown means being less than the unidirectional signal generated by said signal deriving means.

4. A static circuit breaking system in accordance with claim 3 wherein said first means for applying said gating signal includes means for deriving a first output varying as the voltage of said source and diode means for coupling said first output to the corresponding semiconductor breakdown means and for blocking said first output therefrom when the source voltage is negative and said second means for applying said gating signal includes means for deriving a second output varying as the voltage of said source and diode means for coupling said second output to the corresponding semiconductor breakdown means and for blocking said second output therefrom when said source voltage is positive.

5. A static circuit breaking system in accordance with claim 2 where each of said first and second means for applying said gating signal includes means for deriving a unidirectional signal, means for deriving an output varying as the voltage of said source, and semiconductor breakdown means responsive to a preselected magnitude of said output for coupling said unidirectional signal to the gate of the corresponding thyristor and having a holding current lower than said unidirectional signal and wherein said first means for applying said gating signal includes diode means for blocking said output from said breakdown means when the source voltage is negative and said second means for applying said gating signal includes diode means for blocking said output from said breakdown means when the source voltage is positive.

6. A static circuit breaking device in accordance with claim 1 wherein said first and second thyristors are reverse biased when said source voltage is positive and negative respectively, and said control means includes unidirectional signal deriving means, first and second sensing means for generating first and second outputs varying as the voltage of said source, first and second semiconductor breakdown means coupled to said first and second sensing means and responsive to a preselected level of said outputs for coupling said unidirectional signal deriving means to the gates of said first and second thyristors respectively, the holding current of each said breakdown means being lower than said unidirectional signal, first diode means for blocking said first output from said first breakdown means when the source voltage is negative, and second diode means for blocking said second output from said second breakdown means when the source voltage is positive.

7. A static circuit breaking system in accordance with claim 6 wherein each said semiconductor breakdown means includes a hyperconductive diode between said unidirectional signal deriving means and the corresponding thyristor gate and a Zener diode between said hyperconductive diode and the corresponding sensing means, whereby said preselected level is higher than the breakdown voltage of said hyperconductive diode.

8. A static circuit breaking system in accordance with claim 7 wherein said control means includes a transformer having a plurality of secondary windings and a primary winding connected to said source by said switch means and wherein said first and second sensing means are each coupled to one of said secondary windings and said unidirectional signal deriving means includes first and second rectifier means for deriving first and second unidirectional signals and each said rectifier means is energized from one of said secondary windings.

9. A static circuit breaking device comprising in combination, a source of alternating current, a load, first and second thyristors each having an anode, a cathode and a gate with said thyristors connected in parallel and in opposite polarity between said source and said load and being reverse biased respectively when the voltage of said source is positive and negative, control means energized from said source and including means for generating first and second unidirectional signals, first and second means for deriving outputs varying as the voltage of said source, first and second semiconductor breakdown means coupled to said first and second output deriving means respectively for coupling said first and second unidirectional signals to the gates of said first and second thyristors and being broken down when the voltage of said source attains a preselected level, said first and second unidirectional signals being greater than the holding current of said first and second breakdown means, and diode means for disabling said first and second breakdown means respectively when said outputs are negative and positive respectively, and switch means for connecting said control means to and for disconnecting it from said source.

10. A static circuit breaking system in accordance with claim 9 wherein each said semiconductor breakdown means includes a hyperconductive diode connected to couple said unidirectional signal to the thyristor gate and a Zener diode connected between said hyperconductive diode and the corresponding output deriving means, whereby said breakdown means is triggered into conduction at a potential above the breakdown voltage of said hyperconductive diode, and wherein said control means also includes a transformer having a plurality of secondary windings and a primary winding connected to said source by said switch means and each of said means for generating unidirectional signals is energized from one of said secondary windings and each of said first and second output deriving means is energized from one of said secondary windings.

11. A static circuit breaking system for connecting and disconnecting an alternating current electrical source and a load comprising, a plurality of first thyristors having the same orientation connected between said source and said load and a plurality of second thyristors connected between said source and said load and being oriented opposite to said first thyristors, each of said thyristors having a cathode, an anode and a gate and said first and said second thyristors being reverse biased respectively when the voltage of said source is positive and negative, control means for simultaneously applying a continuous unidirectional signal to the gates of all of said first thyristors at a preselected level of the positive half cycle of the source voltage and for applying a continuous unidirectional singal simultaneously to the gates of all of said second thyristors at a preselected level of the negative half cycle of the source voltage, whereby continuous unidirectional gating signals are applied to said thyristors in anticipation of their becoming forward biased so that they begin to conduct at the zero voltage crossing points, and means for connecting said control means to and for disconnecting it from said alternating current source.

12. A static circuit breaking system in accordance with claim 11 wherein said control means includes first and second transformers each having a primary winding and a plurality of secondary windings, a plurality of first rectifier and filter means, each of which is energized from one of said secondary windings of said first transformer, for applying a unidirectional signal across the gate and cathode of one of said first thyristors, and a plurality of second rectifier and filter means, each of which is energized from one of said secondary windings of said second transformer, for applying a unidirectional signal across the gate and cathode of one of said second thyristors.

13. A static circuit breaking system in accordance with claim 12 wherein said control means also include first and second oscillators connected to said primary windings of said first and second transformers respectively and being adapted when energized to supply continuous oscillating signals to said primary windings, said control means further including first means responsive to a preselected level of the positive half cycle of the source voltage for energizing said first oscillator, and second means responsive to a preselected level of the negative half cycle of the source voltage for energizing said second oscillator.

References Cited

UNITED STATES PATENTS

| 3,196,329 | 7/1965 | Cook et al. |
| 3,242,413 | 3/1966 | Hardies _____ 307—284 XR |
| 3,287,571 | 11/1966 | White. |
| 3,305,766 | 2/1967 | Gambill. |
| 3,388,269 | 6/1968 | Bertioli. |

DONALD D. FORRER, Primary Examiner

STANLEY T. KRAWCZEWICZ, Assistant Examiner

U.S. Cl. X.R.

307—305; 328—81